(12) United States Patent
Yonge, III et al.

(10) Patent No.: US 9,325,618 B1
(45) Date of Patent: Apr. 26, 2016

(54) DYNAMIC MANAGEMENT OF SHARED TRANSMISSION OPPORTUNITIES

(75) Inventors: Lawrence W. Yonge, III, Ocala, FL (US); Srinivas Katar, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1145 days.

(21) Appl. No.: 12/645,574

(22) Filed: Dec. 23, 2009

Related U.S. Application Data

(60) Provisional application No. 61/141,984, filed on Dec. 31, 2008.

(51) Int. Cl.
*H04L 12/26* (2006.01)
*H04L 12/801* (2013.01)
*H04L 1/00* (2006.01)

(52) U.S. Cl.
CPC .............. *H04L 47/10* (2013.01); *H04L 1/0009* (2013.01)

(58) Field of Classification Search
USPC ......... 370/229, 230, 235, 252, 254, 348, 349, 370/445, 468, 471
See application file for complete search history.

(56) References Cited

U.S. PATENT DOCUMENTS

| 7,020,105 B2 * | 3/2006 | Cooper .......................... 370/321 |
| 7,724,764 B2 * | 5/2010 | Lifshitz et al. ................ 370/445 |
| 7,729,372 B2 | 6/2010 | Yonge, III et al. |
| 2003/0198246 A1 | 10/2003 | Lifshitz et al. |
| 2004/0156387 A1 * | 8/2004 | Shapira .......................... 370/443 |
| 2005/0141453 A1 * | 6/2005 | Zhu ................................ 370/331 |
| 2005/0220140 A1 * | 10/2005 | Abe et al. ....................... 370/468 |
| 2006/0013129 A1 | 1/2006 | Sterenson et al. |
| 2006/0120282 A1 * | 6/2006 | Carlson ............... H04L 12/2602 370/229 |
| 2006/0270416 A1 * | 11/2006 | Perets et al. ................ 455/452.2 |
| 2007/0025386 A1 | 2/2007 | Riedel et al. |
| 2007/0025391 A1 | 2/2007 | Yonge, III et al. |
| 2007/0064720 A1 | 3/2007 | Sterenson et al. |
| 2007/0097867 A1 * | 5/2007 | Kneckt et al. ................. 370/236 |
| 2007/0165666 A1 | 7/2007 | Lifshitz et al. |
| 2009/0109991 A1 | 4/2009 | Lurie et al. |
| 2009/0109992 A1 | 4/2009 | Lurie et al. |
| 2009/0217325 A1 * | 8/2009 | Kliger ................. H04L 12/2803 725/78 |

OTHER PUBLICATIONS

HomePlug AV Specification Version 1.1, HomePlug Powerline Alliance, May 21, 2007, 673 pages.
Series G: Transmission Systems and Media, Digital Systems and Networks—Access networks—In premises Networks. Home networking transceivers—Enhances physical, media access, and link layer specifications. ITU-T Telecommunication Standardization Sector of ITU, International Telecommunication Union, Jan. 2007, 261 pages.

\* cited by examiner

*Primary Examiner* — Yemane Mesfin
*Assistant Examiner* — Mon Cheri Davenport
(74) *Attorney, Agent, or Firm* — DeLizio Law, PLLC

(57) ABSTRACT

Communicating among stations in a network includes assigning transmission opportunities among a plurality of stations, sending information about transmission requirements in at least one message sent from a first station in the plurality of stations to a second station, and changing the transmission opportunities based on the information in the at least one message.

20 Claims, 7 Drawing Sheets

DYNAMIC MANAGEMENT OF SHARED TRANSMISSION OPPORTUNITIES

CROSS REFERENCE TO RELATED APPLICATIONS

This application claims the benefit of U.S. Provisional Application No. 61/141,984, filed Dec. 31, 2008, the entire content of which is incorporated herein by reference.

TECHNICAL FIELD

This description relates to dynamic management of shared transmission opportunities.

BACKGROUND

A network of communication stations can share a communication medium (e.g. wires connecting multiple stations or spectrum for transmitting radio signals among stations) using a variety of access techniques. The effective utilization of the shared communication medium may be improved by use of shared transmission opportunities. These opportunities may be allocated by a domain master who communicates a medium access plan to the stations on the communication medium.

SUMMARY

In one aspect, in general, a method for communicating among stations in a network includes assigning transmission opportunities among a plurality of stations; sending information about transmission requirements in at least one message sent from a first station in the plurality of stations to a second station; and changing the transmission opportunities based on the information in the at least one message.

Aspects can include one or more of the following features.

The information about transmission requirements is included in a header of the message.

The information about transmission requirements includes at least one of a duration of time required by the first station, a bandwidth requirement, a buffer backlog of the first station, or a physical layer rate of the first station.

Changing the transmission opportunities includes changing an order in which the plurality of stations receive transmission opportunities.

Changing an order in which the plurality of stations receive transmission opportunities includes increasing the priority of at least one station in the plurality of stations.

The information about transmission requirements is included in a message to a master station that assigned the transmission opportunities.

The information about transmission requirements includes whether a station uses an assigned transmission opportunity.

The method further includes decreasing the priority of the station if the station does not use the assigned transmission opportunity.

The method further includes increasing the priority of the station if the station uses the assigned transmission opportunity.

Assigning transmission opportunities includes assigning transmission opportunities based on network topology.

Assigning transmission opportunities based on network topologies includes providing a transmission opportunity to a first station before a transmission opportunity for a second station and the transmission opportunity for the second station before a transmission opportunity for a third station where the third station is not able to reliably detect transmissions by the third station.

Assigning transmission opportunities includes assigning transmission opportunities based on how reliably stations detect each others transmissions.

The stations cannot reliably detect each other's transmissions because at least one of attenuation and noise.

The assigning transmission opportunities based on how reliably stations detect each other's transmissions includes increasing the time between transmission opportunities assigned to the first station and the second station.

The assigning transmission opportunities based on how reliably stations detect each other's transmissions includes assigning the first station and the second station to separate groups.

Changing the transmission opportunities includes changing the duration of transmission opportunities.

Changing the transmission opportunities includes excluding the first station from the plurality of stations being assigned transmission opportunities from a given sequence of shared transmission opportunities.

Changing the transmission opportunities further includes providing the first station with a dedicated transmission opportunity.

Changing the transmission opportunities further includes assigning the first station to a second plurality of stations and assigning transmission opportunities to the second plurality of stations.

Changing the transmission opportunities includes changing a number of transmission opportunities in a sequence of transmission opportunities.

In another aspect, in general, a system for communicating among stations in a network includes a master station configured to assign transmission opportunities among a plurality of stations, and at least a first station in the plurality of stations configured to send information about transmission requirements in at least one message sent from the first station to a second station in the plurality of stations. The master station is configured to change the transmission opportunities based on the information in the at least one message.

In another aspect, in general, a method for communicating among stations in a network includes assigning transmission opportunities among a plurality of stations; observing a behavior of at least one station of the plurality of stations; and changing the transmission opportunities based on the observing.

Aspects can include one or more of the following features.

The observing includes observing if the at least one station transmit during an assigned transmission opportunity.

Changing the transmission opportunities includes changing an order in which the plurality of stations receive transmission opportunities Among the many advantages of the invention (some of which may be achieved only in some of its various aspects and implementations) are the following.

The management techniques enable efficient usage of shared transmission opportunities.

The management techniques enable prioritization of transmissions within the shared transmit opportunities.

The management techniques enable dynamic changes to the shared transmit opportunities based on changes to the traffic characteristics.

The management techniques enable dynamic changes to the shared transmit opportunities based on changes to the channel characteristics.

The management techniques enable enhanced guarantees on the quality of service for transmissions within the shared transmission opportunity.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
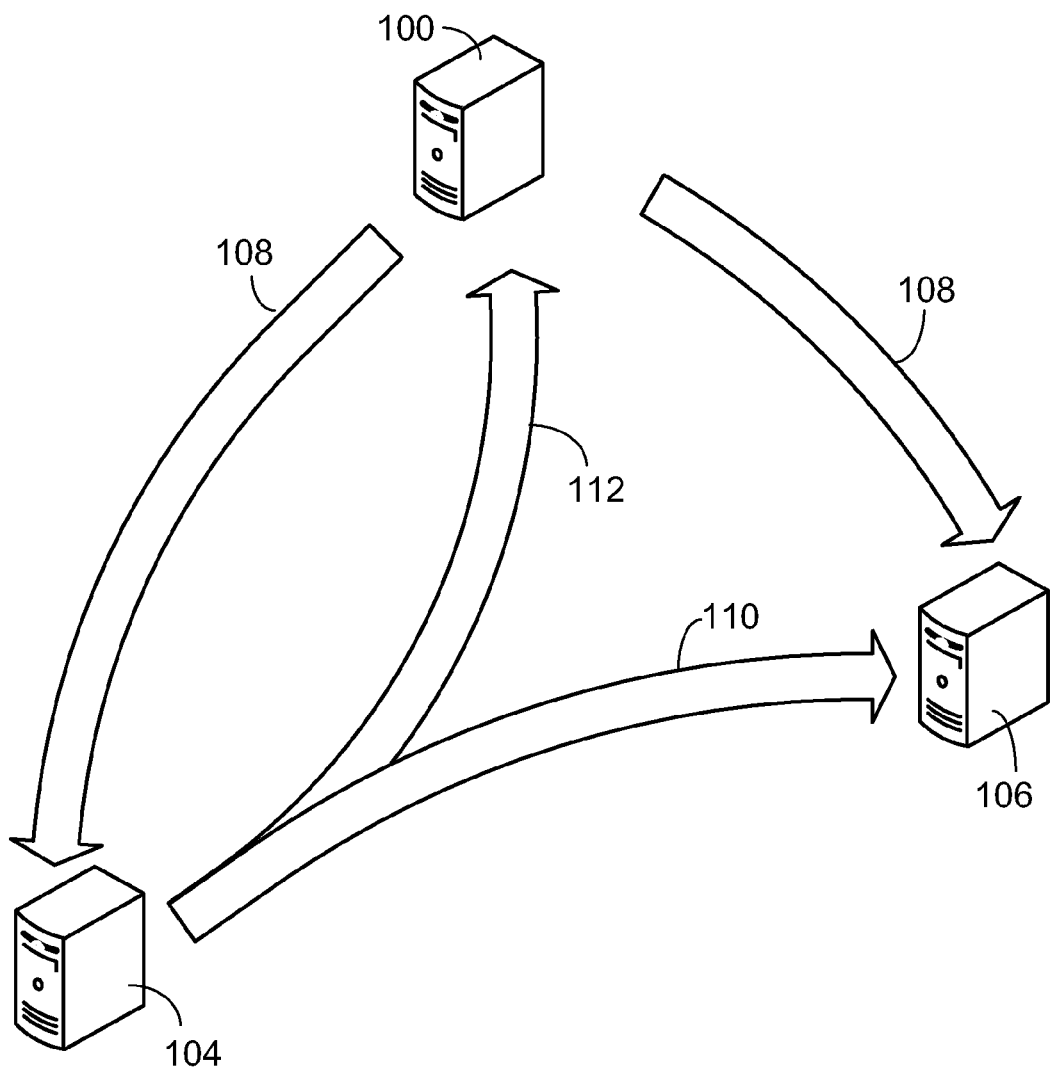
FIG. 1 is a schematic diagram of a communication network.

FIG. 1 shows an exemplary network configuration for dynamic management of shared transmission opportunities. A domain master 100 sends a Medium Access Plan (MAP), represented in FIG. 1 as arrows 108, to stations 104, 106 on the network. The stations include a network interface module to couple to a shared communication medium. The MAP is used to coordinate transmissions over the medium by assigning times during a cycle of communication, as described in more detail below. Some of the time may be assigned for use by a particular station without that station needing to contend among the stations. Some of the time may be shared by allowing the stations to carry out a contention protocol before a particular station wins use of the medium. Some of the time may shared by allowing opportunities for stations to transmit, called "transmission opportunities." A transmission opportunity enables sharing of the communication medium without requiring an explicit contention protocol since the rules for sharing the communication medium are determined by the domain master, as described in more detail below.

During a period when a first station 104 has been assigned an opportunity to transmit, the first station 104 uses the opportunity by initiating transmission and transmits data (e.g., within a data unit) to a second station 106, represented in FIG. 1 as an arrow 110. The data unit may include encoded information about the transmission conditions and requirements of the first station 104. The transmission, directed to the second station 106, may be observed by the domain master 100, represented in FIG. 1 as an arrow 112. The domain master uses the information to update the MAP for the next cycle.

The information about the transmission conditions and requirement may be included in a header of a data unit, for example. Examples of techniques for encoding and/or modulating information in an efficient way that can still be observed by the domain master can be found in co-pending U.S. Provisional Application No. 61/141,978, filed on Dec. 31, 2008, entitled "EFFICIENT COMMUNICATION OVER A SHARED MEDIUM," incorporated herein by reference.

Furthermore, during an opportunity to transmit, the second station 106 may not utilize the opportunity. The domain master 100 may track that the second station did not transmit and may use that information to update the MAP for the next cycle.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the power line medium. Several types of channel access control mechanisms can be used by the MAC including the shared transmission opportunity mechanism described herein and other mechanisms like carrier sense multiple access with collision avoidance (CSMA/CA), centralized Time Division Multiple Access (TDMA), distributed TDMA, token based channel access, etc. Similarly, a variety of retransmission mechanisms can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors.

Some implementations of the PHY layer use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
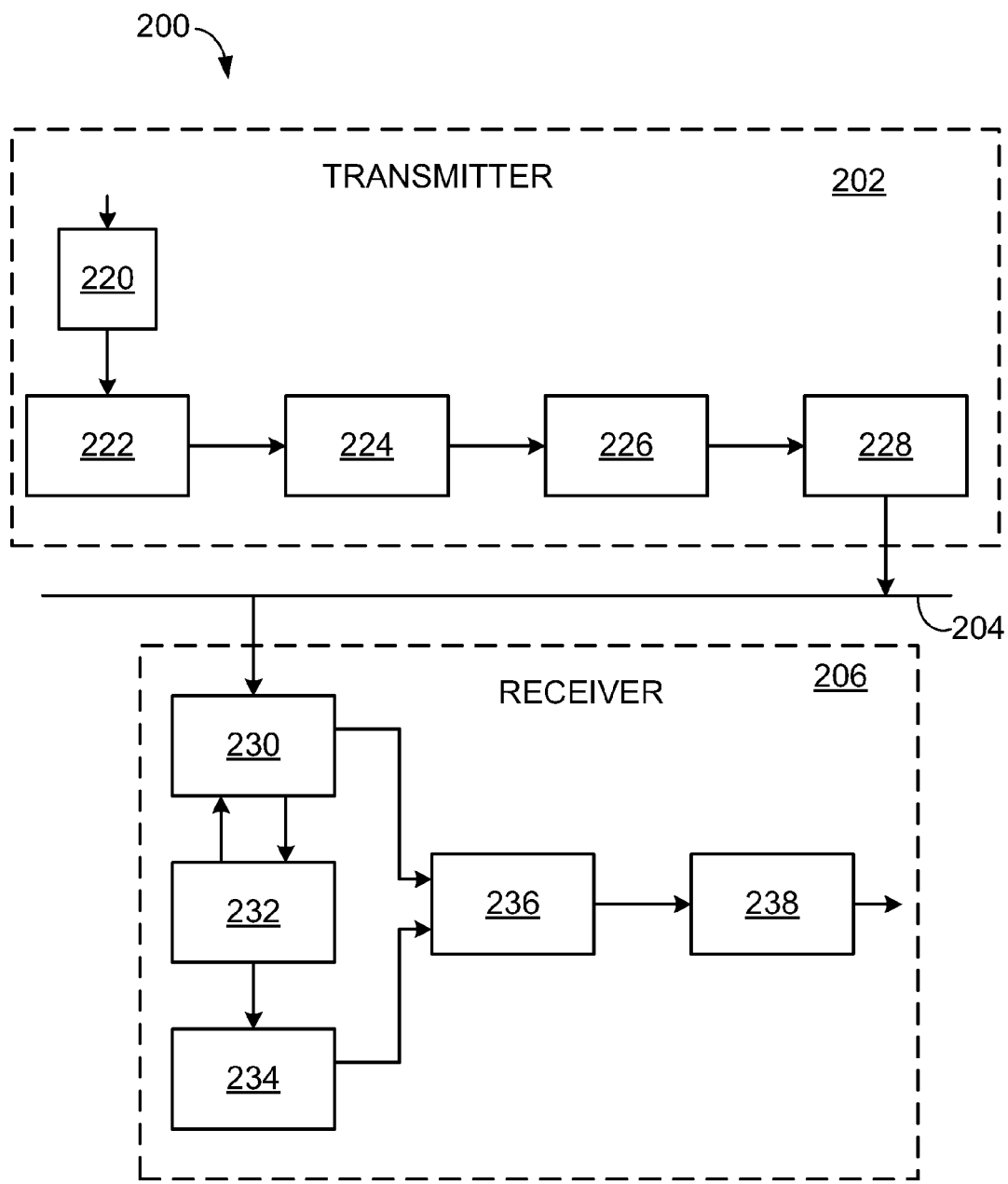
FIG. 2 is a block diagram of a communication system for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi in/N + \Phi_i)] \quad \text{Eq. (1)}$$

where the time index n goes from 1 to N, Ai is the amplitude and $\Phi_i$ is the phase of the carrier with peak frequency $f_i = (i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau;t)$ representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

A variety of channel access techniques are used to coordinate the use of a shared communication medium. One such approach involves a master station (referred to as the domain master) that controls the channel access for all stations in the network (or all stations in a given portion of a network that share a communication medium). A station communicates data within the payload of one or more data units called MAC layer frames. A station can send a series of frames carrying related data (e.g., video data) as a flow (also called a stream). A station may be transmitting data for multiple flows at any given time.

Figure 3:
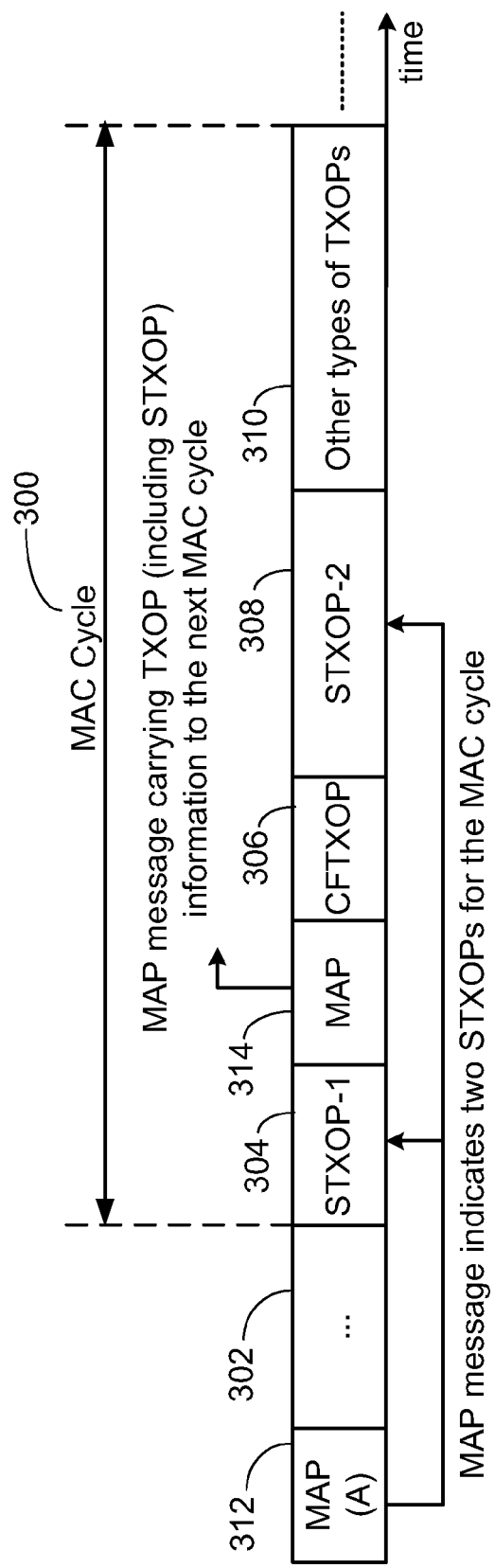
FIG. 3 is a timing diagram of an exemplary MAC Cycle.

Referring to FIG. 3, transmission opportunities may be allocated in some implementations, by a domain master who divides time into repeated intervals (not necessarily of fixed period) called MAC cycles 300. For a given MAC cycle 300, the domain master transmits a Medium Access Plan (MAP) message 312 some time before the MAC cycle 300 begins, as shown by the interval 302. The MAP 312 divides time within one or more MAC cycles into transmission opportunities (TXOPs) 304, 306, 308, 310. A second MAP message 314 which updates the MAP for the subsequent MAC cycle (not shown) is sent before the end of the current MAC cycle 300. In each transmission opportunity one or more stations and flows are provided a chance to transmit. For example, time can be reserved for a single station or flow using a Contention Free TXOP (CFTXOP) 306. Another type of TXOP that enables multiple stations and flows to share the medium is a Shared TXOP (STXOP) 304, 308. Details on the sharing of the medium during a STXOP are described in more detail below.

A flow can be used to transmit a unique type of traffic from a station and a given flow may require special handling. As described above, a station can have multiple flows. For example, a station can have a flow carrying video stream data, a flow carrying Voice-over-IP (VoIP) data and a flow carrying internet browser data.

A MAC cycle 300 with multiple TXOPs. 302, 304, 306, 308, and 310 is shown. In this example, the MAP message 312 transmitted before the start of the MAC cycle 300 contains the TXOP information for the MAC cycle 300. This includes, a CFTXOP 306, two STXOPs 304, 308. Other types of TXOPs can be included in the MAC cycle 300. MAP message 312 indicates the start and end location of the STXOPs 304, 308, and which stations and/or flows share the STXOPs 304, 308 and the method of sharing within the STXOPs 304, 308.

Figure 4:
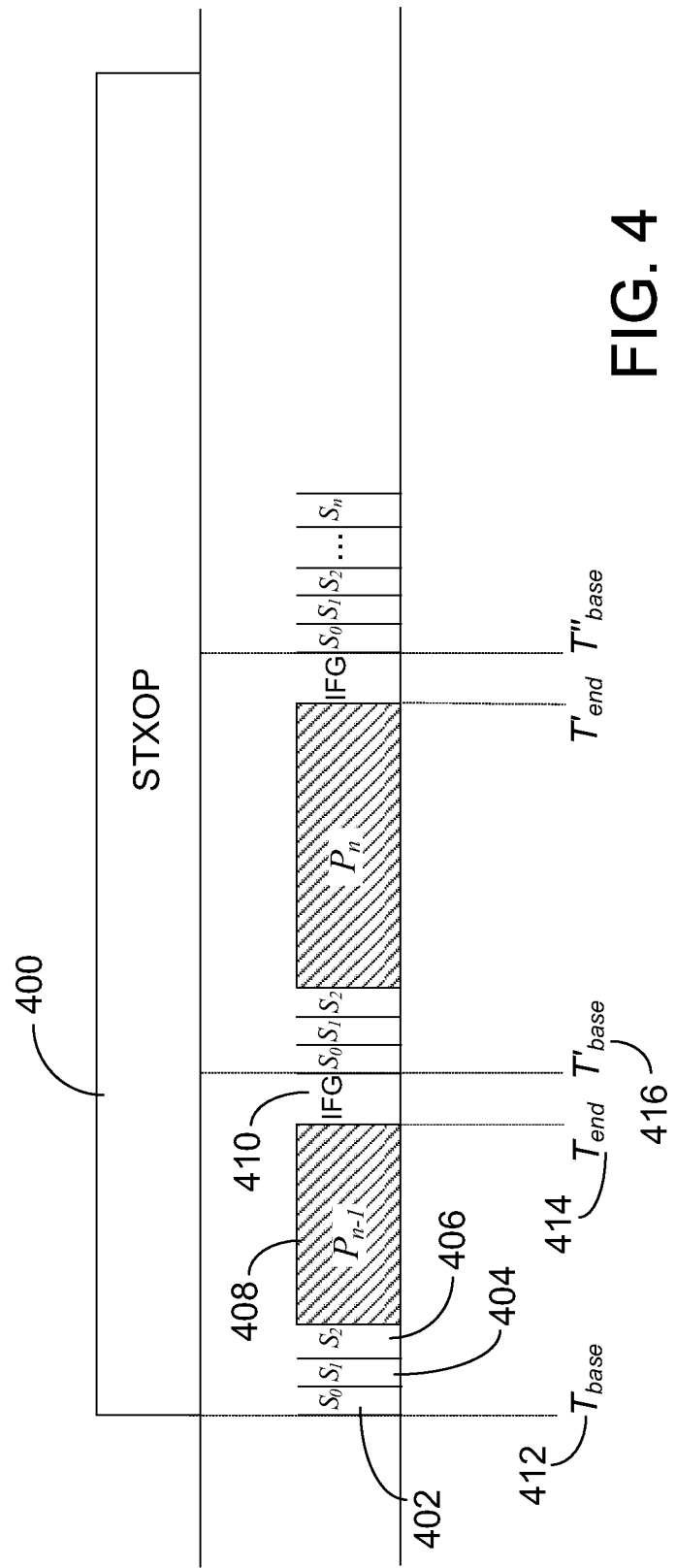
FIG. 4 is a timing diagram of an exemplary shared transmission opportunity.

Referring to FIG. 4, an STXOP 400 is divided into one or more time slots (TSs) 402, 404, 406 where each TS represents a transmission opportunity for the station or stations assigned to this TS. The station assigned to the TS may use that opportunity and start transmitting during the TS, or it may pass on the opportunity to transmit. Once a station starts transmitting during a TS, the transmission may last an arbitrary amount of time. Other stations may use Carrier Sense, or any other detection algorithm, to determine whether or not a station took advantage of the opportunity to transmit in the assigned TS. After a transmission ends, stations determine the start time of the next TS relative to the end of that transmission.

In one implementation, TS start times are calculated relative to a single time base 412. The time base is initially set to the start time of the STXOP 400 (start time of the first TS 402 of the STXOP 400) and is reset at the end of each transmission sequence 408 on the medium. The adjusted time base 416 shall be set to the time, which is the time at the end of the last transmission 414 and the size of the inter-frame gap (IFG) 410.

Transmission rules within a TS depend on the type of the TS. If the station passes on the opportunity to transmit, it can wait until the next opportunity to transmit in a subsequent TS assigned for the station. Each TS should be long enough to allow stations to detect if the TS is utilized. For example, in one implementation, each TS is shorter than a frame of minimum length but long enough to allow stations to use Carrier Sensing to detect whether a TS was used. Other transmission detection mechanisms may also be used.

A STXOP may include, for example, at least the following types of TSs:
 Contention-free TS (CFTS)—a TS assigned to one station or flow
 Contention-based TS (CBTS)—a TS assigned to two or more stations or flows
 Registration CBTS (RCBTS)—a CBTS that is used to allow new stations to register
 Other types of time slots may also be used.

Since a CFTS is assigned to a single station or flow, as long as the stations maintain synchronization in the system, there is no possibility of collision within a CFTS. When a TS is available to more than one station or flow, then collision is possible if two or more stations start transmission in the TS, unless the eligible stations use other means to avoid this situation. Any of a variety of mechanisms to handle or avoid collisions can be used.

In some implementations, an STXOP includes only CFTSs, only CBTSs, or some combination of CFTSs and CBTSs. The domain master allocates STXOPs in accordance with service requirements of network stations.

The TSs scheduled in the MAP for the STXOP 400 form a sequence of transmission opportunity start times that starts at the beginning of the STXOP 400. Each TS, 402, 404, 406 in the grid serves as a placeholder, reserving an opportunity for the stations or flows associated with this TS to transmit. Stations or flows associated with a TS may either utilize the opportunity to transmit or remain idle. In the case that none of the stations or flows associated with a TS utilize the transmission opportunity provided to them by that TS, the stations or flows associated with the next TS in the grid sequence are given the opportunity to transmit.

Stations or flows sharing an STXOP 400 follow the sequence of TS assignments according to TS usage and in accordance with the TS assignment rules advertised in the MAP for that STXOP 400 in order to determine which TS is the next TS permitted to transmit over the communication medium. The following example describes a Sequential TS assignment rule. Other TS assignment rules are also possible.

When following the Sequential TS assignment rule, stations and flows are provided an opportunity to transmit in a specified order whether or not a particular station or flow elects to transmit during its time slot. Further, the transmit opportunity for the last station and flow is followed by the transmit opportunity for the first station and flow in the sequence. For example, referring to FIG. 5, time slots are allocated in the following manner TS 7, TS 6, TS 5, TS 4, TS 3, TS 2, TS 1, and TS 0. TS 3 is provided an opportunity to transmit after TS 4 even though TS 4 transmitted during its time slot. Similarly, TS 7 is provided a transmit opportunity after TS 0 irrespective of whether or not there is a transmission in TS 0. Another non-Sequential rule could, for example, have the time slot sequence reset after a station or node transmits during a given time slot. In this example TS 7 would have the next opportunity to transmit after TS 4 transmitted.

A STXOP 500 is divided into eight TSs: 7 CFTSs (TS 7, TS 6, TS 5, TS 4, TS 3, TS 2, TS 1) and one CBTS (TS 0). In this example, when the sequential TS assignment rule is used for all the TSs of the STXOP 500, the order of the TSs in the STXOP in the MAP starts with a CFTS TS 7 and ends with the CBTS TS 0.

Figure 5:
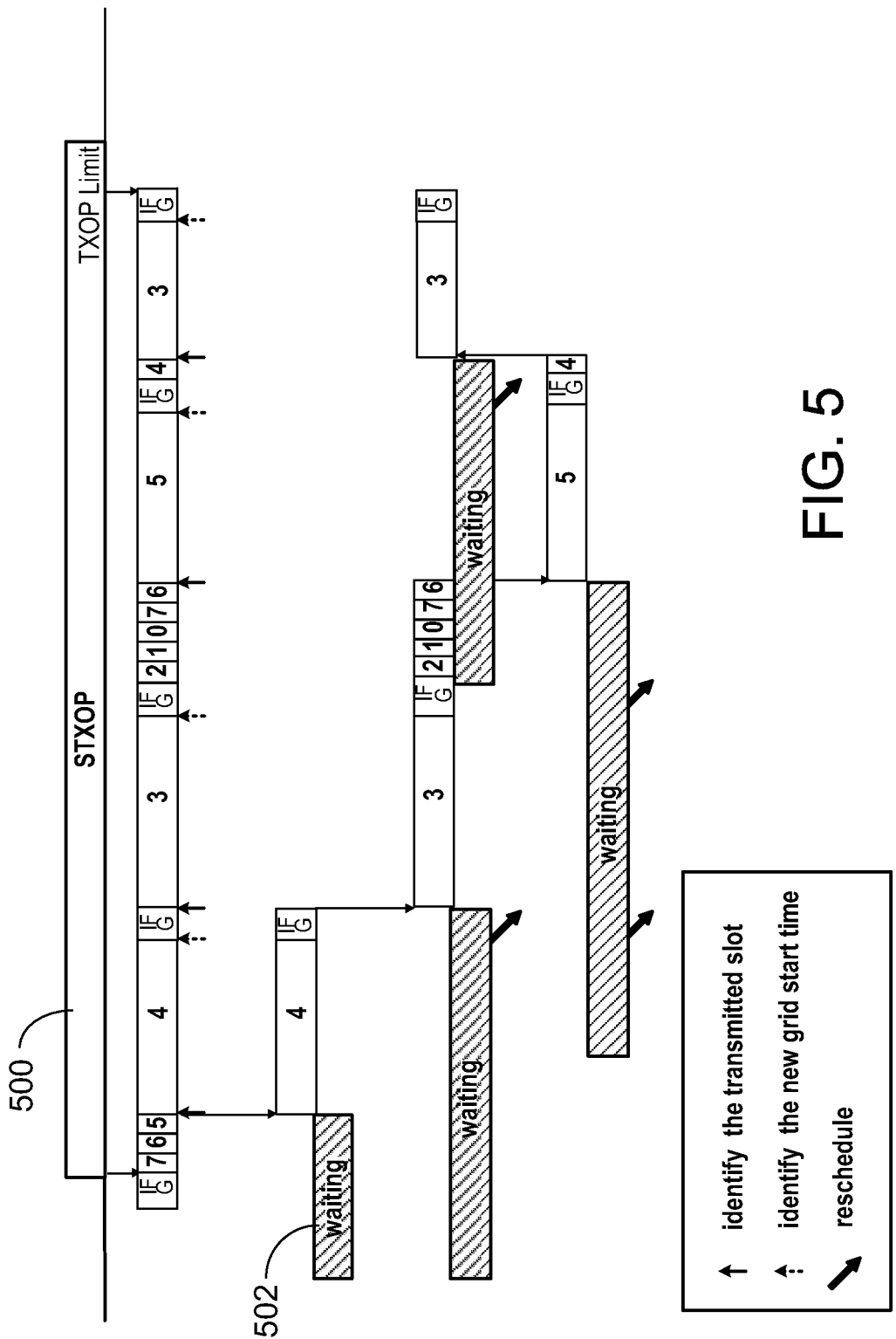
FIG. 5 is a timing diagram of an exemplary shared transmission opportunity.

In this example, the first opportunity to transmit in FIG. 5 is reserved for the station associated with TS 7. The station or flow associated with TS 7 passes on this opportunity to transmit, and so do stations or flows associated with TS 6 and TS 5. The station or flow associated with TS 4 utilizes the allocated time slot for transmission. The station or flow associated with TS 3 identifies that a transmission has occurred starting during TS 4 (e.g., using Carrier Sense) and waits for that transmission to end (e.g., also using Carrier Sense) to identify a new adjusted time base indicating the start of TS 3 after an IFG. Therefore, the station associated with TS 3 should be able to detect transmissions from the station associated with TS 4 within a time duration of one TS so that it won't transmit during what would have been TS 3 if the previous transmission had not occurred. Note that the station or flow associated with TS 7 is always guaranteed to have a TS in each STXOP 500. However, depending on the duration of STXOP and duration of transmissions by various stations or flows, stations or flows associated with TS 6, TS 5, TS 4, TS 3, TS 2, TS 1, have lower probability (and therefore a lower priority) of accessing the medium. Similarly, under these circumstances, TS 6 has a higher probability of accessing the medium than TS 5, TS 4, TS 3, TS 2, and TS 1.

The grid of TSs continues sequentially in the order the TSs were described in the MAP regardless of whether or not a TS was used. Once the current TS on the medium is the last TS that was described for the STXOP in the MAP, the next TS on the medium is the first TS of the STXOP as was described in the MAP (the CFTS of station with associated with TS 7). FIG. 5 also shows waiting time of each station until it reaches the next TS in which its transmission opportunity is assigned.

For example, the length of time the station or flow associated with TS 4 waits, in this example, is represented in FIG. 5 by the bar 502.

Stations or flows using the STXOP may require more or less transmission time for a number of reasons. These include, but are not limited to, changes in the source rate, for example, such as the changes created when the flow carries a variable bit rate stream or burst stream; changes in the physical data rate between the source and the destination, for example changes due to changing channel characteristics such as attenuation or noise; changes in the error rate between the source and destination; changes in the QoS required; or changes in the number of stations with data to send that share the same CBTS or due to bandwidth hogging by stations/flows that are provided with higher priority TSs within the STXOP.

The domain master can use the bandwidth requirement information provided by the station or flow to prioritize stations or flows with the STXOP by using different TS assignments. For example, referring to FIG. 5, if the station or flow associated with TS 1 indicates a high bandwidth requirement compared to the other stations or flows sharing the STXOP, the domain master may, for example, update the TS assignment so that the order of the TSs in the STXOP are as follows TS 1, TS 7, TS 6, TS 5, TS 4, TS 3, TS 2 and TS 0. This guarantees that the station or flow associated with TS 1 gets access to the medium during each STXOP. Other approaches that improve the chances of a station or flow getting access the medium may also be used by the domain master. For example, the domain master may update the TS assignment so that the order of the TS in the STXOP as follows TS 7, TS 6, TS 5, TS 1, TS 4, TS 3, TS 2 and TS 0. This TS assignment enables the station or flow associated with TS 1 to have a higher probability of getting access to the medium compared to the stations or flows associated with TS 4, TS 3, TS 2 and TS 0, thus providing the station or flow associated with TS 1 with a better chance to meet its bandwidth requirements.

Figure 7:
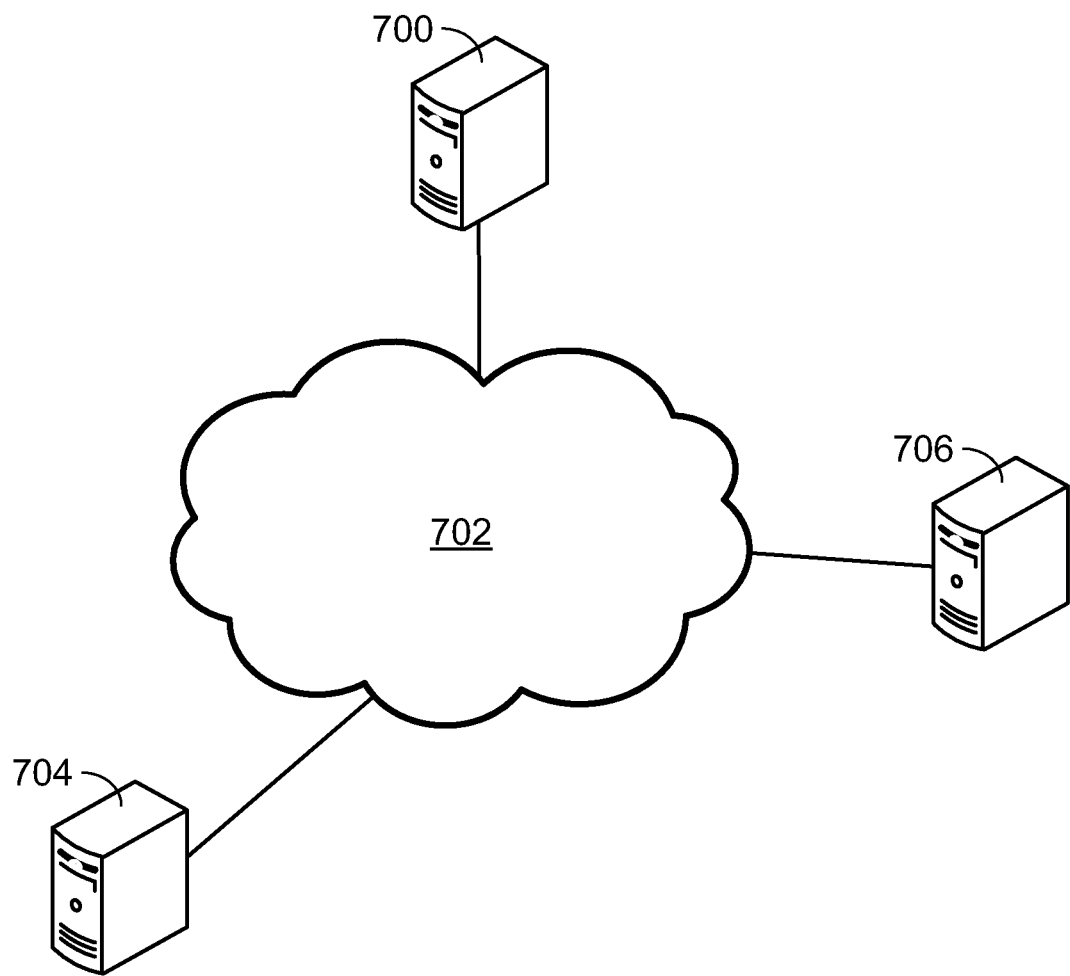
FIG. 7 is a schematic diagram of a communications network.

Referring to FIG. 7, stations 704, 706 and a domain master 700 are connected to a network 702. A station 704 that is part of a STXOP can provide information about their bandwidth requirements to the domain master 700 either during their transmission within the STXOPs or during other opportunities provided by the domain master 700 during the MAP cycle. In some implementations the station includes the bandwidth requirement information in the header fields of transmission made to another station 706. When the header fields are encoded and modulated in a broadcast mode that can be received by every station, the domain master 700 can also receive these fields and process the bandwidth requests. Alternatively, a station 704 may also communicate bandwidth requests to the domain master 700 by transmitting management messages directly to the domain master 700. In some cases bandwidth requests can also be included in any other transmission the station 704 sends to the domain master 704 for any other purpose.

Bandwidth requests can indicate the duration of time required by the station or flow. Alternatively, station can provide information such as buffer backlog and physical layer rates. The buffer backlog indicates to the domain master the amount of data pending at the station, thus enabling the domain master to determine if changes in STXOP are necessary to ensure that the Quality of Service (QoS) requirements for the station or flow are met. Indicating the physical layer data rates enables the domain master 700 to update the STXOP when the physical layer data rate changes due to changes in channel conditions. A variety of other parameters that effectively provide the domain master with information on whether the station or flow requires higher or lower bandwidth can be used for bandwidth requests. For example, the information may include changes in the buffer backlog of the station or flow, percentage increase or decrease in the bandwidth requirement, percentage increase and decrease in the allocation size, changes in application data rates of the flows, change in priority of the traffic etc. The information communicated to the master may also include indication of the urgency of the bandwidth requirements. More urgent bandwidth requests can be provided higher priority by the master in the shared transmission opportunity.

Since the Time Slots within the STXOP are assigned to various stations and/or flows, the domain master can monitor the usage of the time slots to determine if a station/flow is utilizing the STXOP. If a station/flow is not utilizing the TS, then the domain master may reassign the station/flow with a lower priority TS. For example, referring to FIG. 5, if the station or flow associated with TS 7 is not utilizing its TS, and all other stations and flows are properly utilizing the time slots, the domain master may, for example, change the TS assignment in subsequent STXOP so that the order of the TS in the STXOP is as follows—TS 6, TS 5, TS 4, TS 3, TS 2, TS 1, TS 0 and TS 7. This approach improves the efficiency of the STXOP, by preventing wastage of Time Slots. The domain master can use a variety of TS arbitration approaches to minimize or limit the TSs for inactive stations. The domain master may also decide to not provide TS for the station associated with TS 7 in certain MAC cycles to further improve the usage of the STXOPs.

The domain master may also use the network topology information to determine the TS assignment rule. For example, in some implementations, the reliable sharing between stations or flows in a STXOP may require devices to reliably detect other stations transmissions. In certain network topologies, some stations may not be able to reliably detect other station's transmissions. The domain master can use a variety of techniques to obtain the reliability of detection of transmissions from a transmitting station by other stations in the network in a variety of ways. For example, the transmitter may monitor each of its transmissions to a receiver and use the feedback from receiver on the reception status of various transmissions to determine the probability with which the receiver can receive its transmission. The transmitter may provide this information to the domain master. In another example implementation, the receiver may monitor the received transmissions from a transmission and determine the detection reliability for transmissions from that transmitter. The receiver may provide this information to the master. In other implementations, the transmitter and receiver coordinate to determine the detection reliability and provide that information to the master. The domain master may also infer the detection reliability of various transmissions by monitoring the STXOP. In some implementations the domain master may monitor the bandwidth requirement information to infer detection reliability. For example, a station and flow that is provided with a TS cannot successfully reduce its buffer backlog if its transmissions are interfered by transmissions from stations and flows assigned to subsequent time slots that cannot reliably detect its transmission. In an example implementation, master can infer the detection reliability based on the station and flow's bandwidth requirements increasing even when they have one or more opportunity to transmit in the STXOP. The master may also infer detection reliability by monitoring the preamble and header for various transmissions. For example, the master may successfully detect the preamble but may not properly receive the header when the transmission is interfered by transmissions from stations and flows assigned to subsequent time slots that cannot reliably detect the on going transmission. In an example implementation, the master can infer the detection reliability based on the reliability with which the master can receive the preamble and header from various transmissions within the STXOP. The domain master may also infer the detection reliabilities by monitoring CFTXOPs or other types of TXOPs.

Figure 6:
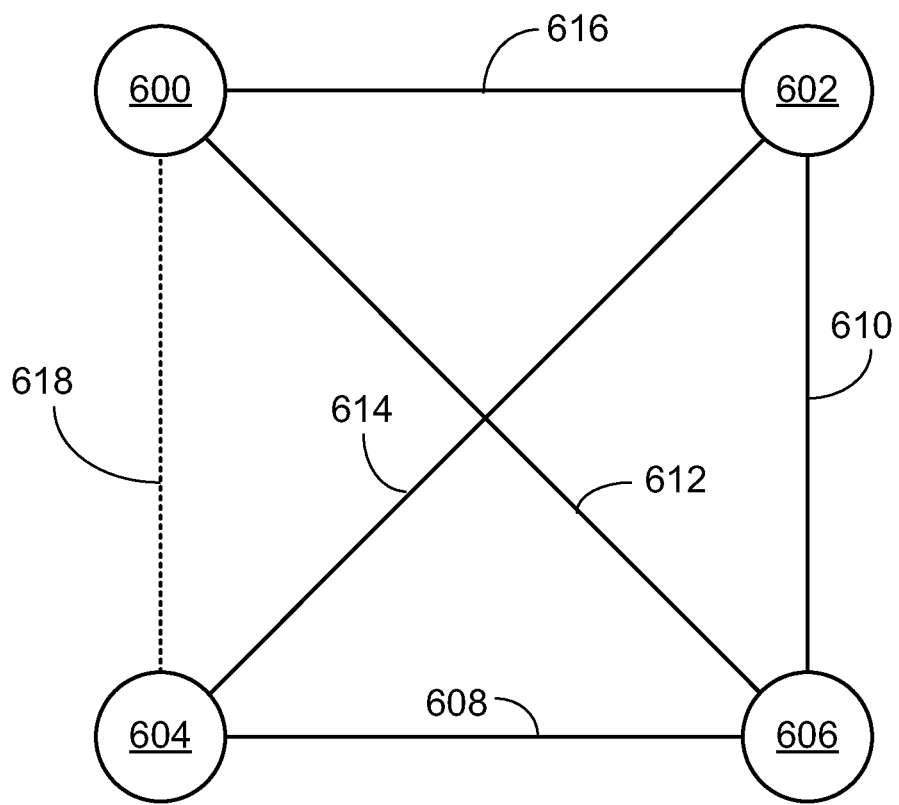
FIG. 6 is a network topology diagram showing an example of communication reliability.

In such cases, the domain master may use a TS assignment that ensures that a TS of a given station is followed by a TS of a station that reliably detects its transmissions (e.g., using a Carrier Sense technique). Referring to FIG. 6, an example network topology includes four stations 600, 602, 604, and 606. Stations that can reliably detect each others transmissions are connected with a solid line 608, 610, 612, 614, 616, while stations that cannot detect each others transmissions are connected with a dashed line 618. In particular, a first station 600 and a second station 604 cannot reliably detect each others transmissions within the amount of time provided in a TS. However, the first station 600 and the second station 604 are more likely to successfully detect transmission by the other station given more time. In this example, the domain master can increase the amount of time for the first station 600 and the second station 604 to detect transmissions from the other by using the topology information. The domain master increases the time between the first station 600 and the second station 604 by ensuring that a TS assigned to the first station 600 is not followed by a TS assigned to the second station 604 and vice versa. For example, the domain master may use a Sequential TS assignment with the following order of TS assignment—first station 600, station 602, second station 604, and station 606. By increasing the separation between the first station 600 and the second station 604, the domain master effectively provides additional time for the first station 600 and the second station 604 to detect each other's transmission, thus enhancing the chances of the first station 600 and the second station 604 detecting each other's transmissions. This is primarily due to the presence of additional signal on the wire, which can be used by the receiver to increase the chances of detection. For example, by increasing the separation between 600 and 604 by one TS, the domain master can provide 604 with 2×TS interval of time to detect a transmission from 600. This additional time allows 604 to better detect the transmission from 600.

In some implementations (for example, HomePlug AV), the Carrier Sense detection is based on processing a portion of the Preamble. However the duration of Preamble itself is larger than the TS. By increasing the separation between TSs of stations that cannot detect each other reliably, the receivers can be provided with additional time to process the full preamble (or a larger portion of the preamble), thus enabling it to have a better chance to detect the transmission. In some implementations, energy sensing mechanism may be used to determine the start of a transmission. In such cases, having a larger duration of signal for sensing the energy can improve the chances of detecting a transmission.

In some network topologies, some stations may not be able detect most of transmission from some transmitters due to poor channel characteristics. In some other network topologies, some stations may not be able to detect any transmission from some transmitters (i.e., stations are hidden with respect to one another). In such cases additional mechanisms can be used to improve the reliability of detection of an on-going transmission. For example, a transmitter may first send a short Request to Send (RTS) and one or more stations in the network respond to the RTS with a short Clear-to-Send (CTS) packets, after which the transmitter proceeds with his transmission. The receivers that cannot detect the RTS may detect the CTS, thus preventing them from interfering with the ongoing transmission. Increasing the separation between the TSs of stations that cannot detect each other provides additional time to detect RTS or CTS, thus increasing the chances of detecting the on going transmission. A variety of other techniques that improve the reliability of detecting an ongoing transmission by having other stations (i.e., stations other than the transmitter) in the network signal the presence of an on going transmission are possible.

In some cases, the domain master may use the network topology information to determine the stations and flows that will be allowed within a STXOP. For example, the domain master may only allow stations and flows that can detect each other reliably to participate in a STXOP. Other stations and flows may be provided a separate STXOP, CFTXOP, or other type of TXOP. Referring to FIG. 6, an example domain master may provide one STXOP where only stations 600, 602 and 606 are provided with a TS and another STXOP where only stations 602, 604 and 606 are provided with a TS. This enables each station in each of the STXOPs to reliably detect each other, thus avoiding issues causes by lack of reliable detection within a STXOP.

Apart from changing the arbitration rules within the STXOP, the domain master may also change the duration of STXOP(s) and/or remove stations and flows that share the STXOP. The domain master may make these changes and others like them, so that, for example, the QoS requirements for the stations and flows using the STXOP can be achieved while maintaining good network utilization. The domain master may also achieve this effect by reallocation within the STXOP. If too many stations are assigned to share the same CBTSs, then the domain master can change the assignments or offer more TSs to the over-subscribed group. If a particular station or flow has a backlog, then the number of TSs assigned to that station or flow and the STXOP duration can be temporarily increased. If there is a persistent change in the time needed by a station or flow, then it can be given a different schedule of TSs assigned to it and/or the STXOP duration may be changed. STXOP can be used for variable bit rate streams. Multiple arbitration rule changes and changes in access patterns may or may not change the total amount of time required by the STXOP. All these changes can be reflected in subsequent MAPs.

The domain master can use the bandwidth requests from the stations and flows with the TS usage information (e.g., whether certain transmission opportunities are actually being used) for making changes to STXOP. If the required amount of time to complete transmissions in the STXOP decreases, then time may be wasted because the domain master has allocated TSs to stations and flows that do not use them. If the required amount of time to complete transmissions in the STXOP increases, then one or more of the stations or flows may suffer from buffer saturation or be unable to deliver all its data in a timely manner, possibly missing real-time deadlines. Finally, the total time provided in the STXOP may be sufficient for the stations or flows it services, but the allocation among those stations or flows may require adjustment. Wasted time and delivery failures are highly undesirable, and with sufficient information about the changing needs of the stations and/or flows serviced by an STXOP, the domain master can dynamically change STXOPs and their MAPs to optimize use of the medium and success rate of the streams carried by the stations and flows.

If the domain master determines that the duration of a STXOP is larger than the aggregate bandwidth requirements requested by the stations/flows, it can decrease the duration of the STXOP. If the stations/flows bandwidth request cannot be accommodate within the currently allocated STXOP duration, then the domain master may increase the duration of the STXOP. The domain master may also determine that certain stations/flows with the STXOP require additional bandwidth and in response provide them with STXOP or CFTXOPs to eliminate their buffer backlog. For example, in a STXOP being shared by several stations and flows, if two stations or flows require additional bandwidth, the domain master may provide a new STXOP where only these two stations or flows are allowed to transmit. This new STXOP can be in addition to the STXOP that is provided to all stations and flows. Alternatively, the domain master may provide CFTXOPs for these two stations or flows to enable them to meet their bandwidth requirements.

In some cases where the STXOP duration cannot be increased due to lack of bandwidth within the network, the domain master may remove one or more stations or flows from the STXOP. This approach enables the remaining stations and flows in the STXOP to meet their quality of service requirements.

If the domain master determines that a station or flow is not using its TS for multiple STXOPs, it can infer that the flows are terminated or the station(s) was removed from the network. In this case, the domain master can stop providing TSs for such stations/flows in future STXOPs.

The system can be used to enhance the operation of STXOPs used for sharing between station or flows with asynchronous traffic. Asynchronous traffic sources typically generate traffic in a non-contiguous manner. For example, traffic generated when a user is browsing the Internet is typically asynchronous in nature. Since the asynchronous traffic is not generated in a contiguous manner, the bandwidth requirements for such traffic cannot be predicted in advance. Stations or flows with asynchronous traffic may remain inactive (i.e., not traffic to send) for long intervals of time. The domain master can use bandwidth requests from stations with asynchronous traffic to prioritize the TS allocation within the STXOP. For example, stations with larger buffer backlog can be provided with higher priority time slots. Inactive station may not be provided with a TS in each MAC Cycle or they may be provided with a very low priority TS. The domain master may monitor the usage of TS allocations to determine which stations or flows are inactive. Alternatively, the domain master may use the lack of any bandwidth requests to implicitly determine that the station or flow is inactive. The domain master may provide Contention Based Time Slot (CBTS) for a group of station or flows that are inactive. This approach minimizes the TS wastage in the presence of inactive stations or flows. The domain master may also monitor transmissions within the CBTS and provide stations or flows sharing the CBTS with Contention Free Time Slot (CFTS) when they become active. Different types of Asynchronous traffic can have different priorities within the network. The domain master can use traffic priority information communicated as part of the bandwidth request to provide differentiated service to traffic with different priorities. Including the bandwidth requirements information in the header of the asynchronous transmission enables the domain master to receive this information in a timely manner, thus enabling it to provide necessary STXOP changes to enhance the quality of service provided to such streams. The bandwidth request information and TS utilization information can be used by the domain master to increase or decrease the size of the STXOP. In some implementations, STXOPs may not be provided in all MAC Cycle. For example, if all the stations and flows in the STXOP are inactive, the STXOP may be only provided once in several MAC Cycle. This enables stations that are inactive to go into power save mode.

Many other implementations of the invention other than those described above are within the invention, which is defined by the following claims.

What is claimed is:

1. A method for communicating among a plurality of stations in a network, the method comprising:
    assigning a first transmission opportunity to a first station of the plurality of stations, wherein the first transmission opportunity precedes a second transmission opportunity;
    assigning the second transmission opportunity to a second station of the plurality of stations;
    determining that information in a message transmitted from the first station to the second station in first transmissions transmitted during the first transmission opportunity indicates a change in a bandwidth requirement associated with the first transmission opportunity;
    determining that second transmissions transmitted during the second transmission opportunity interfere with the first transmissions based on the indicated change in the bandwidth requirement and on a network topology of the network; and
    changing an assignment of the second transmission opportunity based on determining that the second transmissions interfere with the first transmissions.

2. The method of claim 1, wherein
changing the assignment of the second transmission opportunity comprises excluding the second station from being assigned the second transmission opportunity based on the network topology.

3. The method of claim 1, wherein
the information comprises transmission requirements, and
the transmission requirements indicate at least one member of the group consisting of:
    a duration of time required by the first station,
    the bandwidth requirement,
    a buffer backlog of the first station, and
    a physical layer rate of the first station.

4. The method of claim 1, wherein changing the assignment of the second transmission opportunity comprises changing an order of a sequence of assignments of the first transmission opportunity and of the second transmission opportunity.

5. The method of claim 4, wherein changing the order of the sequence of assignments comprises increasing a first priority of the first transmission opportunity to be higher priority relative to a second priority of the second transmission opportunity.

6. The method of claim 1, wherein the information is included in the message to a third station configured to assign the first transmission opportunity and the second transmission opportunity.

7. The method of claim 1, wherein the information indicates whether a third station uses a third transmission opportunity.

8. The method of claim 7, further comprising decreasing a priority of the third transmission opportunity in response to determining that the third station does not use the third transmission opportunity.

9. The method of claim 7, further comprising increasing a priority of the third transmission opportunity in response to determining that the third station uses the third transmission opportunity.

10. A method for communicating among a plurality of stations in a network, the method comprising:
assigning a first transmission opportunity to a first station of the plurality of stations, wherein
the first transmission opportunity precedes a second transmission opportunity;
assigning the second transmission opportunity to a second station of the plurality of stations;
determining whether information in a message transmitted from the first station to the second station in first transmissions transmitted during the first transmission opportunity indicates a transmission error, wherein the information is in at least one member of the group consisting of a header and a preamble of the message;
determining whether second transmissions transmitted during the second transmission opportunity interfere with the first transmissions based on a network topology of the network and a determination that the information indicates the transmission error; and
changing an assignment of the second transmission opportunity based on the determination that the second transmissions interfere with the first transmissions.

11. The method of claim 1, wherein determining that the second transmissions interfere with the first transmissions comprises determining that a third station is unable to reliably detect the second transmissions.

12. The method of claim 1, wherein changing the assignment of the second transmission opportunity comprises increasing a time interval between a start of the second transmission opportunity and an end of the first transmission opportunity.

13. The method of claim 1, wherein
the changing the assignment of the second transmission opportunity comprises assigning the first station and the second station to separate groups.

14. The method of claim 1, wherein
the changing the assignment of the second transmission opportunity comprises changing a duration of the second transmission opportunity.

15. The method of claim 1, further comprising:
the changing the assignment of the second transmission opportunity further comprises providing the first station with a dedicated transmission opportunity.

16. The method of claim 1, wherein
prior to changing the assignment of the second transmission opportunity, the first station and the second station are assigned to a first group of stations, and
changing the assignment of the second transmission opportunity comprises,
assigning the second station to a second group of stations, and
assigning stations with subsequent transmission opportunities to the second group of stations, wherein the subsequent transmission opportunities are subsequent to the second transmission opportunity.

17. The method of claim 1, wherein
changing the assignment of the second transmission opportunity comprises,
changing subsequent transmission opportunities in a sequence of transmission opportunities,
the subsequent transmission opportunities are subsequent to the second transmission opportunity, and
the sequence of transmission opportunities comprises the second transmission opportunity.

18. A device for communicating in a network, the device comprising:
a processor; and
a network interface module coupled with the processor, the network interface module to,
assign a first transmission opportunity to a first station of a plurality of stations, wherein the first transmission opportunity precedes a second transmission opportunity,
assign the second transmission opportunity to a second station of the plurality of stations,
determine whether information in a message transmitted from the first station to the second station in first transmissions transmitted during the first transmission opportunity indicates a transmission error, wherein the information is in at least one member of the group consisting of a header and a preamble of the message,
determine whether second transmissions transmitted during the second transmission opportunity interfere with the first transmissions based on a network topology of the network and a determination that the information indicates the transmission error, and
change an assignment of the second transmission opportunity based on a determination that the second transmissions interfere with the first transmissions.

19. A non-transitory machine-readable medium having instructions stored therein, the instructions to:
assign a first transmission opportunity to a first station of a plurality of stations, wherein the first transmission opportunity precedes a second transmission opportunity;
assign the second transmission opportunity to a second station of the plurality of stations;
determine whether information in a message transmitted from the first station to the second station in first transmissions transmitted during the first transmission opportunity indicates a change in a bandwidth requirement associated with the first transmission opportunity;
determine whether second transmissions transmitted during the second transmission opportunity interfere with the first transmissions transmitted during the first transmission opportunity based on the indicated change in the bandwidth requirement and on a network topology of a network; and
change an assignment of the second transmission opportunity based on a determination that the second transmissions interfere with the first transmissions.

20. A device for communicating in a network, the device comprising:
a processor; and
a machine-readable medium having instructions stored therein, the instructions executable by the processor to cause the device to:
assign a first transmission opportunity to a first station of a plurality of stations, wherein the first transmission opportunity precedes a second transmission opportunity,
assign the second transmission opportunity to a second station,
determine whether information in a message transmitted from the first station to the second station in first transmissions transmitted during the first transmission opportunity indicates a change in a bandwidth requirement associated with the first transmission opportunity,
determine whether second transmissions transmitted during the second transmission opportunity interfere with the first transmissions transmitted during the first transmission opportunity based on an indicated change in the bandwidth requirement and a network topology of the network, and change an assignment of the second transmission opportunity based on a determination that the second transmissions interfere with the first transmissions.

* * * * *